UNITED STATES PATENT OFFICE.

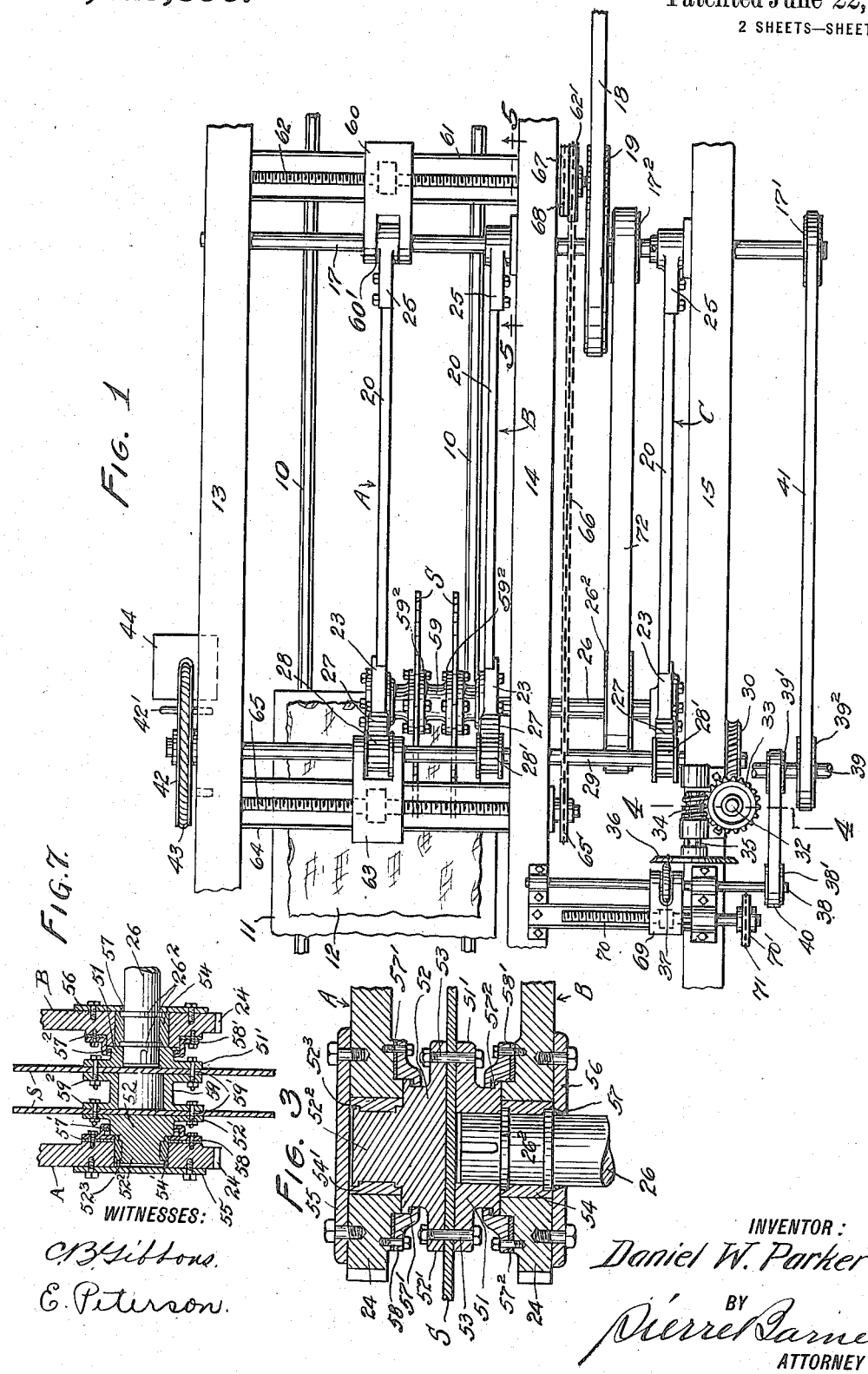

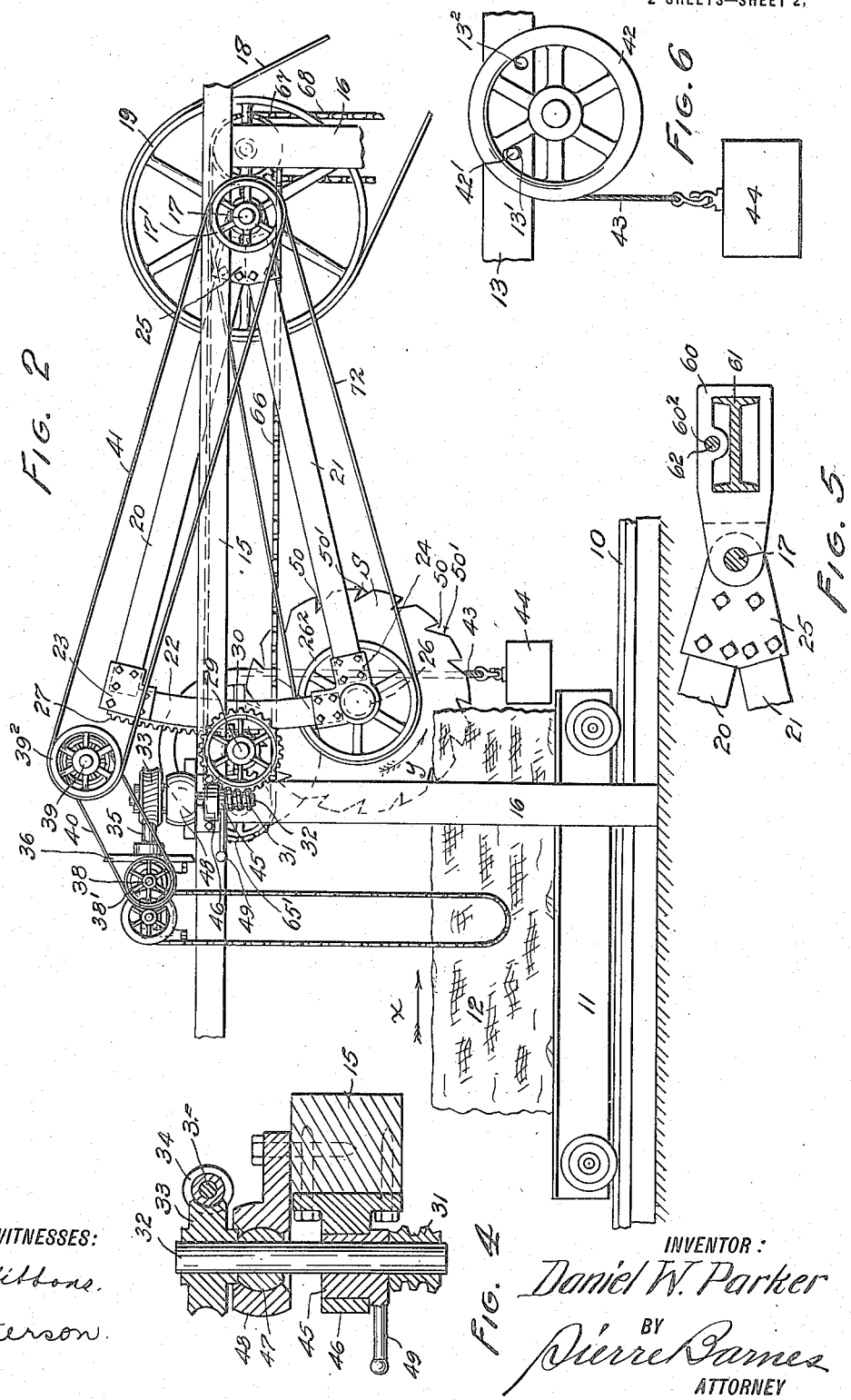

DANIEL W. PARKER, OF EVERETT, WASHINGTON.

STONE-SAWING MACHINE.

1,143,856.

Specification of Letters Patent. Patented June 22, 1915.

Application filed August 21, 1913. Serial No. 785,861.

*To all whom it may concern:*

Be it known that I, DANIEL W. PARKER, a citizen of the United States, residing at Everett, in the county of Snohomish and State of Washington, have invented certain new and useful Improvements in Stone-Sawing Machines, of which the following is a specification.

This invention relates to stone-sawing machines and, more particularly, to improvements in the machine shown and described in patent application, Serial No. 725,610, filed by me October 14, 1912.

The general object of the present invention is to produce a stone-sawing machine having a greater efficiency than those hitherto in use by means of improved devices relating to the stone-abrading saws, the manner of adjustably mounting the same, and by the provision of appliances which regulate the action of the saws to withstand the most severe duty to which they are liable to be subjected.

The invention is illustrated in the accompanying drawings, wherein—

Figure 1 is a plan view of a stone-sawing machine embodying my improvements. Fig. 2 is a side elevation of the same. Fig. 3 is a detail transverse sectional view of the devices employed for securing the saw to the arbor. Fig. 4 is a vertical section taken on line 4—4 of Fig. 1. Fig. 5 is a sectional vertical view on line 5—5 of Fig. 1. Fig. 6 is a fragmentary longitudinal elevation taken from the opposite side of the machine from that shown in Fig. 2. Fig. 7 is a sectional view similar to Fig. 3 to illustrate the manner of securing a plurality of saws to the arbor.

The reference numeral 10 designates the track-rail for a carriage 11 which is operated by power devices (not shown) to afford suitable feed travel for the stone 12 in the direction indicated by arrow $x$ in Fig. 2.

13, 14 and 15 represent longitudinal beams of the machine framework which is supported upon posts such as 16. Journaled in boxes secured to said beams is a transverse shaft 17 which is driven through the medium of a belt 18 passing about a pulley 19 mounted upon the shaft. Hingedly connected to said shaft is an oscillatory frame comprised of a plurality of members A, B and C (Fig. 1) each of which is constituted of arms 20 and 21 which extend in substantially radial directions from the axis of shaft 17 and have their outer ends connected by an arcuate bar 22 which is disposed in concentric relation to the shaft. The arms 20 and 21 are respectively connected to the associated bars 22 by angle-pieces 23 and 24. The ends of the arms adjacent to shaft 17 are secured in socket pieces 25 which are bored to receive the shaft and which serves as the pivotal support for the frame.

26 represents an arbor *per se* for the saw or saws S and is journaled in the above mentioned angle pieces 24. Arcuate racks 27 are rigidly secured to the bars 22 for engagement with toothed pinions 28 and $28^1$ which are splined to a transverse shaft 29 having thereon a gear 30 which, upon occasion, is rotated by a worm 31 mounted upon an upright shaft 32 having, in turn, a gear 33 which is in mesh with a worm 34 provided on a longitudinal shaft 35. The latter is provided with a disk friction element 36 which is driven through the agency of a friction wheel 37 which is splined to a transverse shaft 38. The shaft 38 is driven from a counter-shaft 39 by means of a belt 40 passing about pulleys $38^1$ and $39^1$ provided on the respective shafts, and said counter-shaft is driven from the shaft 17 by a belt 41 passing about the pulleys $17^1$ and $39^2$ upon the referred to shafts.

Carried upon the shaft 29 is a sheave 42 for a line 43 which supports a weight 44, said weight being arranged so that its power will tend to rotate the shaft 29 in a direction to cause the pinions 28 and $28^1$ to impart a downward movement to the oscillatory frame through the medium of the racks 27 with the object of providing a yielding pressure to the saw upon the work when the above described power-actuated devices are rendered inoperative. To such ends, the worm 31 is adapted to be engaged with or disengaged from the gear 30, as through the agency of an eccentric bushing 45 mounted for rotary movement in a box 46 which is rigidly secured to the frame-member 15 in proximity to said worm; while a globular bushing 47 is provided in a box 48 to afford unconstrained oscillatory movements to the shaft 32 when the eccentric bushing is operated.

49 represents a handle for turning the bushing 45 when putting said worm into and out of register with the gear.

Abrading shot and water are utilized with the saw, or saws, which are provided in their peripheries with angular shaped recesses, or gullets, 50 having the rear sides $50^1$ of each inclined so that they will progressively force the shot down against the bottom of the kerf to promote the abrasion of the stone.

In Fig. 3 is illustrated the preferred manner of clamping a saw to its arbor and also devices for protecting the journal bearings from gritty matter. The clamping devices comprise two cast metal members 51 and 52 provided with flanges $51^1$ and $52^1$ which are juxtaposed with the saw, as shown, and through which the clamping bolts 53 extend.

The arbor extends into the member 51 to within proximity of the saw. The arbor is journaled in brasses 54 provided in one of the frame elements 24. At the other side of the saw, a journal is afforded by a stub $52^2$ provided on a clamp member 52 acting in coöperation with brasses $54^1$, which are housed in another of the elements 24. Annular ridges $26^2$, for the arbor, and $52^3$, for the stub $52^2$, interfitting with grooves provided in the respective brasses, serve to obviate any endwise movement to the arbor. To prevent the admission of grit to these journals I provide a cover-plate 55 detachably secured to the outer frame element 24 and spanning the extremity of the stub $52^2$ and the brasses $54^1$. A collar 56 surrounds the arbor, as shown, and is employed to retain packing 57 in place about the arbor. Packing $57^1$ and $57^2$ is also utilized with retaining collars 58 and $58^1$ to protect the interstices between the clamping members and the companion frame-elements 24. The above mentioned collars are each made of semi-circular segments in order to allow their being placed in position.

Where more than one saw is to be employed, a spacing member 59 (Figs. 1 and 7) is interposed between the adjacent saws, said spacing member being provided with flanges $59^2$ to receive the saw clamping bolts $59^1$ which also serves to secure the spacing member to the members 51 and 52. When saws are connected to the arbor by means of the above described devices, the pinion 28 must be correspondingly shifted transversely in unison with the member A in order that the rack 27 of the latter will remain in mesh with the pinion. Accordingly, a block 60 provided with a recess $60^1$ in which to receive the socket-piece 25 of such member is slidable upon a transverse beam 61 of the frame through the instrumentality of a screw 62 operating in a threaded hole $60^2$ provided in the block. Similarly, a block 63 slidable upon a transverse beam 64 is provided for the pinion 28 and has a screw-threaded hole for a screw 65. The blocks 60 and 63 must be shifted in unison and to such end, the respective screws are provided with sprocket wheels $62^1$ and $65^1$ for an endless chain 66. Also mounted on one of the screws is a sprocket wheel 67 for an endless chain, indicated by 68, extending into convenient reach of the operator. The friction wheel 37 may have its position regulated with respect to the axis of disk 36 in any suitable way. As illustrated, the wheel is controlled by a block 69 which is shifted by means of a screw 70 through the agency of an endless chain 71 passing about a sprocket wheel $70^1$ provided on the screw.

The saw arbor 26 is driven by a belt 72 passing about pulleys $17^2$ and $26^2$ on the shaft 17 and arbor, respectively.

$42^1$ represents a pin engageable in holes $13^1$ or $13^2$ provided in the frame-beam 13 for engaging the wheel by its spokes, for example, to limit the extent of the lowering of the weight 44 to correspond with the height of the saw for a predetermined depth of cut.

For operation, the requisite number of saws are secured to the arbor 26, as above explained, the frame element A being accordingly shifted by actuating the block 60 through the agency of the screw 62 by means of the chain 68. When the screw 62 is thus rotated, the other screw 65 which is operatively connected thereto by the chain 62 is likewise rotated with a consequent movement to the block 63 which controls the position of the pinion 28. By such devices, the frame member A may be adjusted to accommodate one or more saws. The oscillatory frame is swung down to present the saws at a selected depth by means of the power operated worm 31 acting through the medium of the gear 30 upon the shaft 29 which carries the pinions 28 and $28^1$.

When the saws have been lowered for a predetermined depth of cut, the pin $42^1$ is inserted in one of the holes $13^1$ or $13^2$ which will engage a spoke of sheave 42 to prevent the latter turning to any appreciable amount in the direction which would further lower the frame or the weight 44. The worm 31 is now uncoupled from the gear 30 and the carriage 11 advanced to feed the stone to the saw. As the saw is driven in the direction of the arrow $y$ in Fig. 2, the tendency of the saw is to roll upwardly from the kerf, and should the feed of the carriage be excessive, the power of the weight 44 will be overcome and the oscillatory frame tilted up to relieve the saw until the carriage feed has been lessened or a heavier weight been applied to the line 43.

What I claim, is—

1. In a stone-sawing machine, the combination with a frame comprised of a plurality of members adjustable relative to each other, an arbor journaled in one of said members, a flanged member secured to the end of said arbor, a second flanged member disposed in axial alinement with said arbor and provided with a stub which is journaled in the other of the frame members, a saw, and means for securing said saw to both of said flanged members.

2. A stone-sawing machine having a frame comprised of a plurality of members adjustable relative to each other, a plurality of racks secured to said members, pinions engaging said racks, power driven means for driving said pinions for effecting vertical swinging movements of said frame, a saw-arbor carried by the frame, and means for simultaneously adjusting the positions of one of said pinions and the relative positions of the frame members to accommodate one or more saws to the arbor and the frame.

3. In a stone-sawing machine, a frame, saws, an arbor journaled in said frame, a flanged member for securing one of said saws to the arbor, a second flanged member provided with a stub which is journaled in said frame for another of said saws, and spacing means interposed between the saws and secured thereto.

4. In a stone-sawing machine, the combination with the framework of the machine, of a frame supported by said framework, said frame being comprised of two members adjustable relative to each other, a saw-arbor journaled in the swinging frame, elements supplemental to said arbor for securing a saw or a number of saws to said arbor and affording a second journal in the frame, and means for adjusting the relative positions of the aforesaid members whereby the frame is regulated to accommodate the respective journals.

Signed at Seattle, Wash., this 12th day of August, 1913.

DANIEL W. PARKER.

Witnesses:
 PIERRE BARNES,
 JOHN A. HALL.